(12) United States Patent
Biver et al.

(10) Patent No.: US 9,327,460 B2
(45) Date of Patent: May 3, 2016

(54) OPTICAL ELEMENT COMPRISING A CRACK-FREE AEROGEL

(75) Inventors: Claudine Biver, Charenton-le-Pont (FR); Jean-Paul Cano, Charenton-le-Pont (FR); Rémi Courson, Charenton-le-Pont (FR); Sylvie Calas-Etienne, Montpellier (FR); Pascal Etienne, Montpellier (FR)

(73) Assignees: Essilor International (Compagnie Generale D'Optique), Charenton Le Pont (FR); Centre National de la Recherche Scientifique—CNRS, Paris (FR)

( * ) Notice: Subject to any disclaimer, the term of this patent is extended or adjusted under 35 U.S.C. 154(b) by 292 days.

(21) Appl. No.: 13/994,613

(22) PCT Filed: Dec. 14, 2011

(86) PCT No.: PCT/FR2011/052983
§ 371 (c)(1),
(2), (4) Date: Jun. 14, 2013

(87) PCT Pub. No.: WO2012/080658
PCT Pub. Date: Jun. 21, 2012

(65) Prior Publication Data
US 2013/0309453 A1 Nov. 21, 2013

(30) Foreign Application Priority Data
Dec. 16, 2010 (FR) ...................................... 10 60614

(51) Int. Cl.
| | | |
|---|---|---|
| *B05D 5/06* | (2006.01) | |
| *B29D 11/00* | (2006.01) | |
| *G02B 1/06* | (2006.01) | |
| *G02C 7/08* | (2006.01) | |
| *G02C 7/10* | (2006.01) | |

(52) U.S. Cl.
CPC ............ *B29D 11/00865* (2013.01); *G02B 1/06* (2013.01); *G02C 7/083* (2013.01); *G02C 7/101* (2013.01); *G02C 7/108* (2013.01); *G02C 2202/16* (2013.01); *G02C 2202/18* (2013.01); *Y10T 428/24496* (2015.01)

(58) Field of Classification Search
CPC .......................... G02B 1/11–1/118; G02B 1/06
USPC .................................................. 427/162–169
See application file for complete search history.

(56) References Cited

U.S. PATENT DOCUMENTS

| | | | | |
|---|---|---|---|---|
| 5,409,683 | A | * | 4/1995 | Tillotson et al. .............. 423/338 |
| 5,948,482 | A | | 9/1999 | Brinker et al. |
| 7,828,430 | B2 | | 11/2010 | Ballet et al. |
| 8,052,278 | B2 | | 11/2011 | Bovet et al. |

(Continued)

OTHER PUBLICATIONS

Schottner, G., "Hybrid Sol-Gel-Derived Polymers: Applications of Multifunctional Materials," Chem. Mater. 13, pp. 3422-3435, 2001.

*Primary Examiner* — Elizabeth Burkhart
(74) *Attorney, Agent, or Firm* — Seed IP Law Group PLLC

(57) ABSTRACT

A method manufactures an optical element having a surface that includes cells filled with an aerogel that does not crack during its manufacture or during a subsequent step of impregnating the aerogel with a liquid. The disclosure also relates to the optical elements that can be obtained using the method.

12 Claims, 3 Drawing Sheets

(56) References Cited

U.S. PATENT DOCUMENTS

Figure 1:
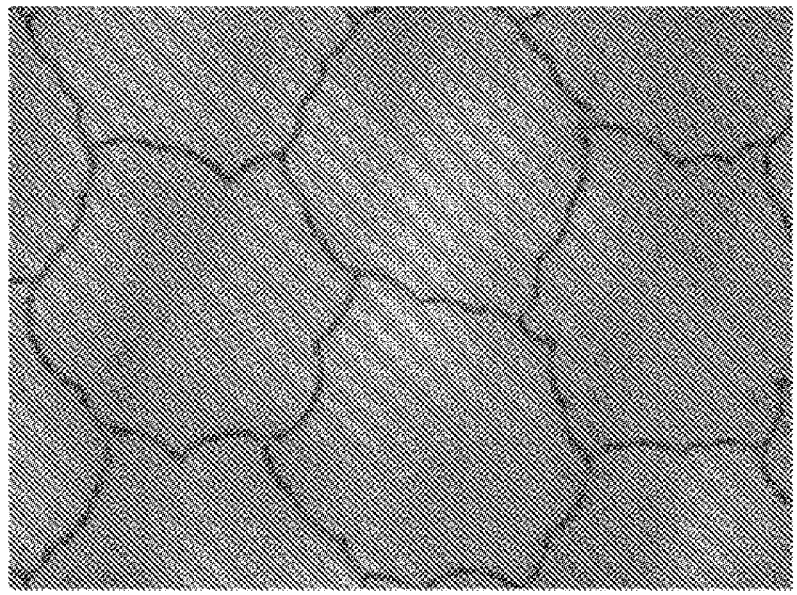

| | | |
|---|---|---|
| 8,092,892 B2 | 1/2012 | Keppner et al. |
| 8,172,397 B2 | 5/2012 | Ballet et al. |
| 8,231,217 B2 | 7/2012 | Ballet et al. |
| 2004/0038818 A1* | 2/2004 | Risen et al. .................. 502/407 |
| 2006/0006336 A1 | 1/2006 | Cano et al. |
| 2006/0154044 A1 | 7/2006 | Yamada et al. |
| 2007/0053062 A1* | 3/2007 | Sasaki et al. .................. 359/582 |
| 2008/0075895 A1* | 3/2008 | Yamaki et al. ................ 428/1.33 |
| 2008/0212018 A1* | 9/2008 | Ballet et al. .................. 351/159 |
| 2010/0035039 A1* | 2/2010 | Jing et al. .................... 428/304.4 |

* cited by examiner

OPTICAL ELEMENT COMPRISING A CRACK-FREE AEROGEL

TECHNICAL FIELD OF THE INVENTION

The present invention relates to a process for manufacturing an optical element comprising, at its surface, cells filled with a crack-free aerogel.

In French patent application FR 2 872 589 A1, the Applicant described a process for producing a transparent optical element comprising at least one assembly of cells juxtaposed parallel to the surface of this element, it being possible for each cell to contain a substance having optical properties.

Advantageously, this substance may be a liquid or a mixture of several liquids, the refractive index of which has a fixed value. If the cells are filled with liquids having different refractive indices, it is possible to create an optical element having a refractive index that varies spatially. The amplitude of this spatial variation of the refractive index of the optical element then depends on the maximum difference in refractive index between the liquids filling the cells. In order to have optical elements that have a large variation in the refractive index, it is therefore necessary to have liquids that have large differences in the refractive index. However, currently, the difference in the refractive index that can be obtained with liquids that are conventionally available is at most equal to 0.2 to 0.3.

One solution envisaged for achieving larger differences in the refractive indices is to leave certain cells empty. The difference then obtained between the refractive index of the liquid and that of the air is larger, of the order of 0.6 to 0.7.

However, tests have revealed that the presence of empty cells, that is to say the cells filled solely with air, leads to technical problems during the step of sealing the cells.

The Applicant has proposed to fill the cells with an aerogel. Aerogels are ultraporous materials, the porosity of which typically reaches at least 75% of their volume. This large porosity gives these solids advantageous properties, in particular a very low refractive index, close to that of air ($n<1.35$), they are also very light. Advantageously, silica aerogels may be transparent. Indeed, it is known that the transparency of the aerogels is directly linked to the conditions of the synthesis of the gel, and a person skilled in the art knows how to carry out suitable processes in order to obtain a transparent aerogel. The aerogels may then be selectively impregnated by various liquids having predefined refractive indices, or else they can be left empty, that is to say filled with air, so as to create a large difference in the refractive index.

PRIOR ART

The conventional methods used in the prior art for manufacturing aerogels comprise the following steps: the preparation of a sol comprising a hydrolyzed alkoxysilane, the deposition of this sol into the desired container, a step of maturation leading to the formation of a gel, then the supercritical drying of the gel obtained.

Supercritical drying is a well-known drying that consists in evaporating a solvent by making it pass from the liquid phase to the supercritical phase then to the gas phase. The supercritical phase of a fluid is situated above the critical temperature and above the critical pressure of this fluid. The physical properties of a fluid in the supercritical phase, in particular its density and its viscosity, are intermediate between those of liquids and those of gases.

The solvent contained in the pores of the gel may have a critical point (critical temperature ($T_c$) and critical pressure ($P_c$) pairing) that is much too high compared to that which the container of the gel is capable of withstanding. In these cases, conventionally, the solvent contained in the pores of the gel is replaced by another more suitable solvent, in particular $CO_2$, and sometimes ethanol and water. These solvents have the following critical points:

water: $T_c=373°$ C., $P_c=221$ bar
ethanol: $T_c=241°$ C., $P_c=61$ bar
$CO_2$: $T_c=31°$ C., $P_c=74$ bar.

This supercritical drying technique makes it possible to obtain a solid that has an extremely light structure, virtually without shrinkage of the solid. The processes described in the prior art make it possible to obtain aerogels with very high porosities, of greater than 95% and that can sometimes reach 99% or more.

However, due to their very high porosity, aerogels are considered to be fragile materials. The conventional production of aerogels, and also the use thereof, may be accompanied by cracking. The cracks may, for example, take the form of crazing visible at the surface of the aerogel.

Cracks may appear in the aerogel during its manufacture, more particularly during the supercritical drying of the gel.

New cracks may appear or preexisting cracks may expand during the impregnation of the aerogel with the liquid. Indeed, the penetration of a liquid into the aerogel may create sufficient capillary tensions to induce the cracking of the aerogel.

However, for applications in the field of optics, it is necessary to avoid the cracking of the aerogels in order to guarantee the best possible transparency of the materials.

Another technique, described for example in U.S. Pat. No. 5,948,482, makes it possible to manufacture aerogel-type materials in film form without using supercritical drying. This technique consists in preparing a gel from an alkoxysilane sol, then in reacting this gel with a derivatizing agent, preferably a silane in hexane, and in depositing the fluid obtained by immersion (dip coating) or centrifugation (spin coating) in film form.

However, the materials obtained according to this technique have a porosity of the order of 60%, and consequently a refractive index that is too high for the desired applications. It is possible to increase the porosity up to a level of 90% by carrying out a heat treatment at 450° C. Such a heat treatment would however damage the optical element on which it is desired to manufacture the aerogel, in particular if this optical element contains organic polymers.

The objective of the present invention is therefore to develop a process for manufacturing an optical element comprising at its surface, cells filled with an aerogel that does not crack either during its manufacture, or during a subsequent step of impregnating the aerogel with a liquid.

SUMMARY OF THE INVENTION

One subject of the present invention is consequently a process for manufacturing a transparent optical element comprising the successive steps consisting in:
a) providing an optical element comprising, at its surface, at least one open cell;
b) carrying out a surface treatment of said cell in order to increase the wettability of its surface;
c) preparing a solution comprising:
   an organic-aqueous solvent, preferably a mixture of water and of a water-soluble alcohol, more preferably a water/ethanol mixture;

at least one organic polymer, soluble in said solvent, the weight-average molecular weight of which is greater than 10 000 g/mol, preferably between 30 000 and 1 000 000 g/mol;

at least one alkoxysilane selected from the group consisting of ($C_1$ to $C_3$ alkyl)tri($C_1$ to $C_3$ alkoxy)silanes and tetra($C_1$ to $C_3$ alkoxy)silanes and mixtures thereof;

d) adding an acid or base hydrolysis catalyst to the solution so as to obtain a sol;

e) depositing the sol in the pretreated cell before the gel point of the sol is achieved and sealing the filled cell using a film;

f) leaving the optical element to stand in an alcoholic atmosphere for between 15 minutes and 5 hours in order to obtain the maturation of the gel;

g) removing the film sealing the cell in an alcoholic medium;

h) carrying out, in an autoclave, the supercritical drying of the gel contained in the cell so as to obtain an aerogel.

Another subject of the present invention is the optical element capable of being obtained by this process.

This optical element may also be subjected to a process, which is also a subject of the present invention, comprising a step that consists in impregnating the aerogel contained in the at least one cell of the optical element with a liquid, then a step that consists in sealing the impregnated cell with a means for isolating and protecting the contents of the cell from the external atmosphere.

The transparent optical element containing an impregnated aerogel capable of being obtained by this process is also a subject of the present invention.

DETAILED DESCRIPTION

Within the meaning of the present invention, an optical element is described as "transparent" when an object that is observed through this element is perceived without significant loss of contrast, in other words, when an image can be formed through the optical element with sufficient quality, in terms of contrast and sharpness in particular.

Step a) of the process according to the invention consists in providing an optical element comprising, at its surface, at least one open cell. Such optical elements have already been described in the prior art, in particular in patent applications FR 2 872 589, EP 1 904 884, EP 1 904 885, EP 1 904 887, EP 1 904 888. A person skilled in the art will find sufficient information in these documents to manufacture or obtain such optical elements. They may be optical lenses, in particular hard or soft, noncorrective or corrective ophthalmic lenses.

This optical element has at least one open cell, preferably several open cells, on the surface of this element. Preferably, the cells are juxtaposed against one another, and are separated by intercellular walls that are parallel to one another. Preferably, the largest dimension of the opening of the cells is between 10 and 10 000 μm (micrometers), in particular between 50 and 500 μm.

The bottom of each cell may be flat, concave or convex. Preferably, the largest value of the height of the cell(s) is between 1 and 100 μm (micrometers), preferably between 5 and 50 μm.

The optical element may also comprise a transparent support. This support may be flexible or rigid depending on the future use of the optical element. Preferably, the support is selected from the group consisting of a mineral glass, an organic glass and a polymer film. Preferably, the cell(s) is(are) formed on a substrate made of PET, made of glass or made of silicon which is attached to the support.

The surface of the cells is subjected, in a step b), to a surface treatment in order to increase its wettability. Consequently, the adhesion of the aerogel to the walls of the cell is improved.

In the present invention, use is preferably made of a cold plasma so as not to damage the materials of the optical element by exposure to a high temperature.

Plasma surface treatments are techniques well known to a person skilled in the art. They make it possible in particular to carry out depositions of thin films, chemical grafting at the surface, and also surface cleaning and etching.

In the present invention, the objective of the surface treatment is to increase the wettability of the surface of the cell. This will have the effect of promoting the impregnation of the cell by the sol, then later of enabling a better attachment of the gel and of the aerogel to the cell.

Preferably, in the process according to the invention, use may be made of cleaning (or degreasing) plasmas, and/or of plasmas that graft OH groups at the surface. Preferably, the surface treatment carried out in step b) is performed with a low-pressure oxygen plasma. It is also envisaged to use a corona treatment, which is an atmospheric pressure plasma-type treatment, or else a UV/ozone surface treatment.

Step c) of the process according to the invention consists in preparing a solution comprising:

an organic-aqueous solvent;

at least one organic polymer, soluble in said solvent, the weight-average molecular weight of which is greater than 10 000 g/mol, preferably between 30 000 and 1 000 000 g/mol;

at least one alkoxysilane selected from the group consisting of ($C_1$ to $C_3$ alkyl)tri($C_1$ to $C_3$ alkoxy)silanes and tetra($C_1$ to $C_3$ alkoxy)silanes and mixtures thereof.

Preferably, the organic-aqueous solvent is a mixture of water and of a water-soluble alcohol, in particular a lower-alcohol such as methanol, ethanol, propanol and butanol. More preferably, the organic-aqueous solvent is a water/ethanol mixture.

The organic polymer present in the solution prepared in step c) is soluble in the organic-aqueous solvent. Its weight-average molecular weight, determined by size exclusion chromatography (SEC), is greater than 10 000 g/mol.

The organic polymer is preferably selected from the group consisting of polyvinyl acetate, polyvinyl alcohol, poly(vinyl acetate-co-vinyl alcohol) copolymers; polyoxyethylene, polyoxypropylene and mixtures thereof. More preferably the polymer is polyvinyl acetate.

The alkoxysilane is preferably tetramethoxysilane (TMOS).

Preferably, the solution is stirred for a sufficient duration so that the various compounds are dissolved, for example for around 10 minutes.

Added to the solution obtained at the end of step c) is an acid or base hydrolysis catalyst so as to obtain a sol.

This catalyst may be a strong base or a strong acid. Preferably, in the process according to the present invention, it is a strong base which is used, preferably a mineral base, such as ammonium hydroxide. Indeed, the use of a strong base rather than a strong acid makes it possible to obtain aerogels that are more transparent. In the presence of this catalyst, the alkoxysilanes undergo a hydrolysis, followed by a condensation reaction of the Si—OH groups formed.

Very preferably, the sol obtained at the end of step d) comprises:
- from 0.5% to 20% by weight, preferably from 2% to 15% by weight, more preferably from 4% to 13% by weight, and more preferably still from 6% to 12% by weight, of polyvinyl acetate,
- from 20% to 60% by weight, preferably from 25% to 50% by weight, more preferably still from 30% to 45% by weight, of tetramethoxysilane, the solvent consisting of a water/ethanol mixture.

According to one embodiment of the present invention, the sol obtained at the end of step d) also comprises an additive selected from silica particles, preferably colloidal silica particles and conductive particles, said conductive particles preferably being selected from indium tin oxide (ITO) particles, tin oxide particles and metal particles, in particular gold or silver particles.

During the addition of the hydrolysis catalyst, the solution is preferably kept under vigorous stirring. The sol-gel transition takes place after a certain time, which depends on numerous parameters, among which mention may be made of the nature and the concentration of the alkoxysilane and of the polymer, the nature and the concentration of the catalyst, the temperature of the sol, and the stirring which is imposed thereon. The moment when this transition takes place is referred to as the gel point. The sol-gel transition is expressed by a sudden increase in the viscosity of the fluid.

Step e) of the process according to the invention consists in depositing the sol in the cell before the gel point of the sol is achieved and in sealing the filled cell using a film. This step e) must never be carried out after the gel point of the sol since the latter is then too viscous to be correctly deposited in the cell.

The sol may be deposited in the cell according to any suitable technique known to a person skilled in the art. One preferred technique consists in depositing a certain amount of sol on the sample, then in laminating a film over the surface of the cell. Such a technique is, for example, described in patent application WO 2007/1132116. The cell is preferably completely filled by the sol. In addition, if the optical element comprises several cells, it is preferable for the latter to be all filled with the same amount of sol.

The sealing of the cell with a film makes it possible to encapsulate the sol being gelled in the cell. The film used for sealing the cell is preferably flexible, in particular if it is deposited by lamination. It is impermeable to alcohol and insoluble in the solvent of the sol. It is preferably a polymer film, for example made of PET.

Generally, the surface tension which is exerted between the sol and the film is sufficient to keep the film in place on the surface of the cell, and to ensure the sealing of the cell. Other means, for example the use of an adhesive or the application of a constant pressure, may be used. However, since the film has subsequently to be removed, attaching the film permanently is ruled out. It has been observed that the means of non-permanent sealing of the cell do not generally make it possible to ensure a total impermeability to gases.

During step f) of the process according to the invention, the optical element comprising the sol encapsulated in the cell is left to stand in an alcoholic atmosphere for between 15 minutes and 5 hours in order to obtain the maturation of the gel. The expression "alcoholic atmosphere" denotes an atmosphere saturated in alcohol vapor. Due to potential failings in the impermeability of the sealing of the cell, an evaporation of the solvent during the maturation may take place. The usefulness of the alcoholic atmosphere lies in the fact of avoiding this evaporation. Indeed, a thermodynamic equilibrium is obtained between the vapor pressure of the solvent of the sol during maturation and the alcoholic atmosphere. If the sealing of the cell was completely impermeable, which is not generally the case, then this maturation step f) could be carried out, in a manner equivalent to the invention, without the alcoholic atmosphere.

At the end of the maturation step f), a cell filled with gel is obtained. The film sealing the cell is removed during step g) of the process according to the invention in an alcoholic medium. This alcoholic medium is liquid. Preferably, the alcoholic medium is anhydrous if the drying step h) is carried out with supercritical $CO_2$ since water and liquid $CO_2$ are immiscible. It is preferably a bath of absolute ethanol in which the optical element comprising the cell is submerged. Since the gel is solid, it does not dissolve in the alcohol. The film is removed and the optical element is taken out of the bath in order to be introduced into an autoclave.

Step h) of the process according to the invention consists in carrying out, in an autoclave, the supercritical drying of the gel contained in the cell so as to obtain an aerogel. Preferably, the drying step h) is carried out with supercritical $CO_2$ since the critical temperature and critical pressure values of $CO_2$ are low, thus avoiding the possible damaging of the optical element by excessive temperatures.

The drying step h) is preferably broken down into the following various successive substeps:
- introducing into the autoclave the optical element comprising the gel-filled cell;
- introducing liquid $CO_2$ into the autoclave and replacing the solvent of the gel with liquid $CO_2$;
- raising the temperature and pressure in order to reach and then exceed the supercritical conditions of $CO_2$ (Tc=31° C., Pc=74 bar), preferably up to a temperature between 34° C. and 40° C. and up to a pressure between 80 and 150 bar;
- dropping the pressure down to atmospheric pressure;
- dropping the temperature down to ambient temperature.

$CO_2$ is preferably introduced into the autoclave in liquid form. In order to do this, and depending on the equipment available, it may be useful to firstly cool the autoclave down to a temperature between 3° C. and 8° C., before introducing the optical element into the autoclave. The pressure is then increased up to around 60 bar during the introduction of the liquid $CO_2$.

At the end of the supercritical drying step h), an aerogel is obtained. This aerogel comprises no or very few cracks and adheres correctly to the cell of the optical element.

The aerogel remains however, a fragile material. The lower its density, the more fragile it is. So as to prevent any risk of cracking, the process according to the invention also preferably comprises a supplementary step i) consisting, after the supercritical drying step h), in purging the autoclave in which the drying was carried out with an anhydrous gas, before removing the optical element. The anhydrous gas may typically be pure argon or nitrogen. The objective of this purge is to expel the last residual traces of solvent, in particular vapors of alcohol and $CO_2$, which could still be in the pores of the aerogel. The purge is preferably carried out slowly to prevent the aerogel from cracking.

In addition, it is possible to finish the process according to the present invention with a step j) consisting in placing the optical element obtained at the end of step h), or optionally step i), into a chamber where the humidity of the atmosphere is controlled. It may be, for example, a vacuum desiccator.

The optical element capable of being obtained by the process described above is also one subject of the present invention. This optical element comprises, at its surface, at least one open cell filled with a silica-based aerogel comprising at least one organic polymer, the weight-average molecular weight of which is greater than 10 000 g/mol, preferably a polyvinyl acetate. This aerogel may be described as a hybrid aerogel since it comprises a mineral compound and an organic compound.

The aerogel according to the present invention preferably has a porosity of greater than 75%, more preferably of greater than 80% and more preferably still of between 82% and 95%. The porosity of an aerogel may conventionally be measured by gas adsorption and desorption or by mercury porosimetry. The refractive index of this aerogel may be equal to between 1.05 and 1.35, preferably between 1.1 and 1.25.

The aerogel has, at its surface, no or very few cracks that are visible to the naked eye or using an optical microscope.

The optical element thus obtained can be used in various ways by a person skilled in the art. It finds a particularly advantageous use when the aerogel is impregnated with a liquid. Another subject of the present invention is a process for impregnating the optical element capable of being obtained according to the process described above, comprising a step that consists in impregnating the aerogel contained in the at least one cell of the optical element with a liquid, then a step that consists in sealing the impregnated cell with a means for isolating and protecting the contents of the cell from the external atmosphere.

The liquid is preferably a liquid having a low surface tension and/or a low saturation vapor pressure. It may be selected from the group consisting of ionic liquids and oils, for example silicone oils. In the preferred case where the optical element comprises several aerogel-filled cells, it is envisaged to impregnate the aerogels with various liquids, in particular with liquids that do not have the same refractive indices, or not to impregnate all the aerogels. In this way, it is possible to obtain an optical element of which the surface has a large spatial variation of the refractive index.

When the aerogel has been impregnated, the cell may be sealed by any means available to a person skilled in the art in order to isolate and protect the contents of the cell from the external atmosphere. The sealing of the cell may be temporary, but is advantageously permanent. One preferred means consists in depositing, on the surface of the optical element, an adhesive-coated polymer film. Another envisaged means consists in polymerizing a film on the surface of the optical element. A process for depositing a polymer film is, for example, described in patent application EP 1 672 394.

The aerogel manufactured according to the process of the present invention has the advantage of not cracking during the impregnation with a liquid. The impregnated transparent optical element capable of being obtained by the process described above has, at its surface, no or very few cracks that are visible to the naked eye or using an optical microscope.

The invention will be better understood in light of the following nonlimiting and purely illustrative examples, taken in combination with the appended drawings in which FIGS. 1 to 6 are photographs, taken by optical microscopy, of several optical elements before the cells are filled with the aerogel, then after the cells are filled with an aerogel according to various processes.

EXAMPLES

The process according to the invention has been exemplified using optical elements comprising a substrate made of glass or made of PET, adhesively bonded to a glass slide. The surface of the substrate is covered by a network of juxtaposed cells, of hexagonal shape, the opening of which measures around 200 µm. The cells are separated from one another by walls of photocurable resin that are parallel to one another and perpendicular to the substrate, measuring 20 µm in height.

FIG. 1 is a photograph, taken by optical microscopy, of the optical element used, in which it is possible to see the hexagonal-shaped cells.

1) Comparative Example

Ethanol (50% by volume) and tetramethoxysilane (TMOS, 33% by volume) were introduced into a sample tube with stirring. After mixing for 10 minutes, ammonium hydroxide ($5 \times 10^{-2}$ mol/l, 17% by volume) was added to the mixture with strong stirring. The gel time of the sol thus formed is around 15 minutes.

A drop of the sol was deposited on the optical element, on the side of the cells. A sheet of PET film was laid on top and, using a roller, the sheet of PET film was laminated over the optical element so as to encapsulate the cells. The lamination was carried out less than 15 minutes after the addition of ammonium hydroxide to the TMOS solution.

The optical element comprising the gel encapsulated in the cells was introduced into an autoclave. The autoclave was cooled to a temperature between 5° C. and 10° C. Liquid $CO_2$ was then introduced into the chamber of the autoclave and the pressure was gradually increased in order to reach 60 bar. Next, the temperature of the autoclave was increased to the value of ambient temperature. When the $CO_2$ replaced the solvent trapped in the pores of the gel, the pressure and the temperature were increased to reach 31.5° C. and 75 bar. Finally, the autoclave was brought back to atmospheric pressure, then to ambient temperature.

The optical element was then taken out of the autoclave, and the PET film was carefully removed.

Figure 2:
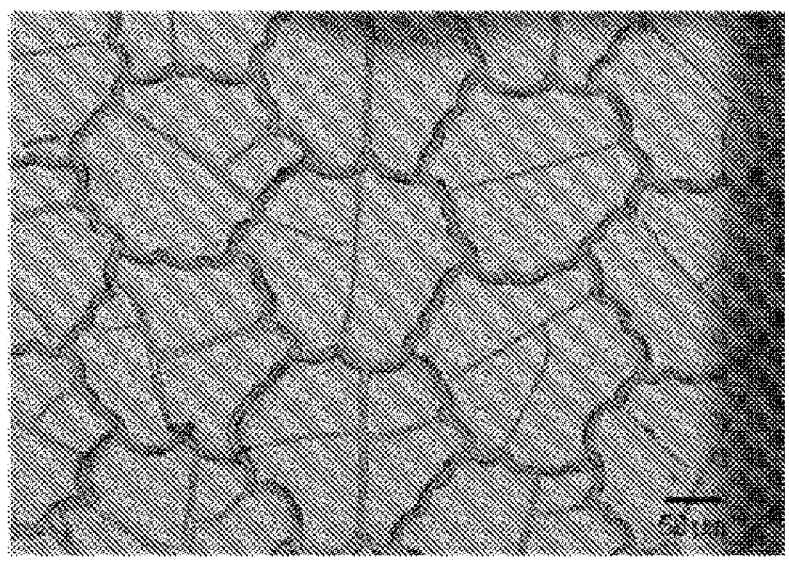

FIG. 2 is a photograph, taken by optical microscopy, of the optical element comprising cells filled with aerogel obtained by the process described above in the comparative example.

It is observed that the aerogels of all the cells comprise cracks. In addition, it can be seen in this figure that the aerogels are detached from the walls of the cells.

2) Example According to the Invention

The optical element comprising the juxtaposed cells of hexagonal shape was subjected to a radio-frequency oxygen plasma surface treatment for 90 seconds (oxygen flow rate=200 ml/minute, pressure=15 mmHg (i.e. around 2 kPa), ambient temperature.

A polyvinyl acetate (PVAc) was used having a weight-average molecular weight Mw≈167 000 g/mol (data from the supplier). PVAc was dissolved in 96% ethanol. The complete dissolution of the polymer in the solvent required 1 to 4 hours of mixing using ultrasound waves alternated with vigorous mechanical stirring. The solution obtained comprises 1% by weight of PVAc.

This aqueous-alcoholic solution of PVAc (50% by volume) and tetramethoxysilane (TMOS, 33% by volume) were introduced into a sample tube with stirring. After mixing for 10 minutes, ammonium hydroxide ($5 \times 10^{-2}$ mol/l, 17% by volume) was added to the mixture with strong stirring. The gel time of the sol thus formed is around 9 minutes.

A drop of the sol was deposited on the optical element, on the side of the cells. A sheet of PET film was laid on top and, using a roller, the sheet of PET film was laminated over the optical element so as to encapsulate the cells. The lamination was carried out less than 9 minutes after the addition of ammonium hydroxide to the solution of TMOS and PVAc.

The optical element comprising the sol encapsulated in the cells was introduced into a chamber, the atmosphere of which is saturated in alcoholic vapor. The gel was left under this atmosphere for 2 hours.

The autoclave was cooled to a temperature of between 5° C. and 10° C.

During this time, the optical element was immersed in a bath of liquid absolute ethanol and the PET film was removed.

The optical element comprising the gel encapsulated in the cells was placed in the cooled autoclave. Liquid $CO_2$ was then introduced into the chamber of the autoclave and the pressure was gradually increased in order to reach 60 bar. Next, the temperature of the autoclave was brought back up to the value of ambient temperature. When the $CO_2$ replaced the solvent trapped in the pores of the gel, the pressure and the temperature were increased to reach 31.5° C. and 75 bar. Finally, the autoclave was brought back to atmospheric pressure, then to ambient temperature.

Before being opened, the autoclave was purged slowly with argon. The optical element was then taken out of the autoclave and placed in a desiccator put under vacuum.

Figure 3:
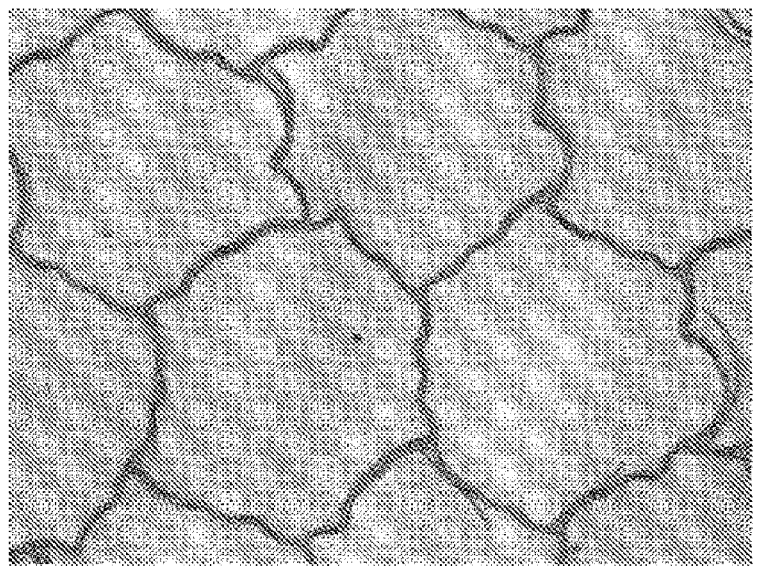

FIG. 3 is a photograph, taken by optical microscopy, of the optical element comprising cells filled with aerogel obtained by the process according to the invention described above.

It is observed that the detachment of the aerogel from the walls of the cells has virtually disappeared. Similarly, there are fewer visible cracks.

The same protocol was followed to produce three new optical elements containing higher concentrations of PVAc: the concentration of PVAc in the starting aqueous-alcoholic solution, which was 1% by weight in the above example, was set at 5%, then 10%, and finally 20% by weight.

The composition of the sols produced, after addition of the hydrolysis catalyst, is the following:

| % by weight of PVAc in the 96% ethanol solution initially prepared | Composition of the sols obtained after addition of the hydrolysis catalyst | | | |
|---|---|---|---|---|
| | % by weight of PVAc | % by weight of ethanol | % by weight of TMOS | % by weight of aqueous NH$_4$OH solution |
| 1% | 0.5 | 43.7 | 37.8 | 18.0 |
| 5% | 2.1 | 43.0 | 37.2 | 17.7 |
| 10% | 4.2 | 42.1 | 36.4 | 17.3 |
| 20% | 8.1 | 40.4 | 34.9 | 16.6 |

Figure 4:
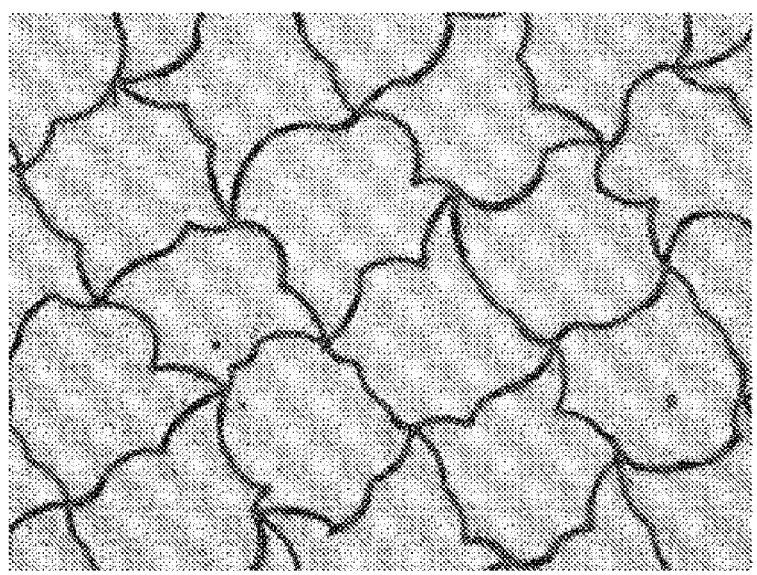
Figure 5:
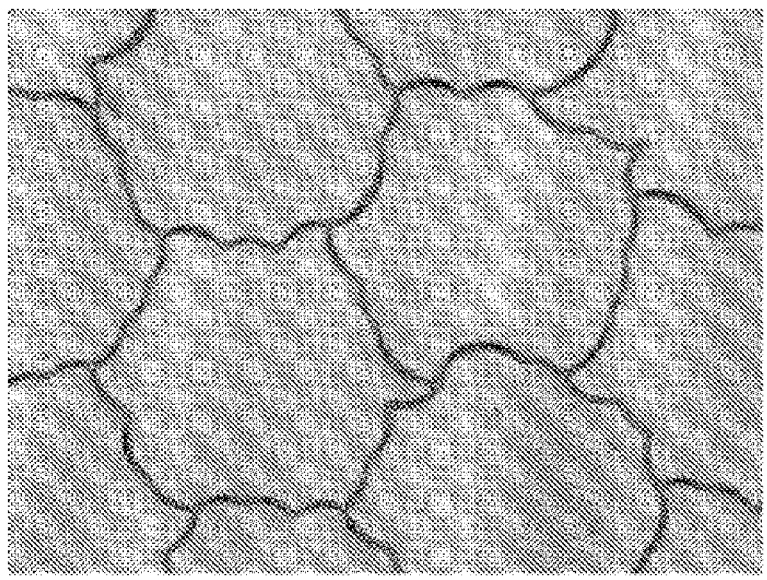
Figure 6:
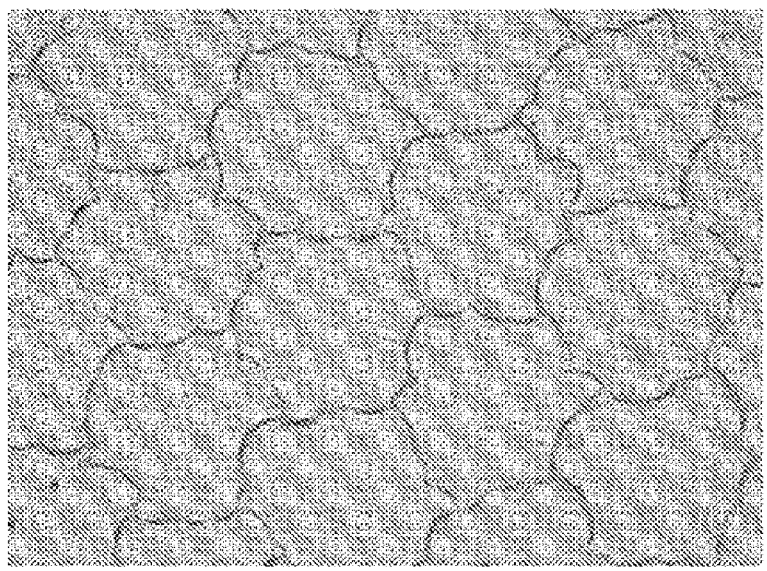

The optical elements obtained are shown in FIGS. 4, 5 and 6, which are photographs taken by optical microscopy.

It is observed that the aerogels no longer have visible cracks and adhere to the walls of the cells.

The Young's modulus of the various aerogels obtained was measured by the nanoindentation technique, using a Berkovich diamond tip. The force applied was measured and recorded as a function of the penetration depth. The Young's modulus was determined by the conventional Oliver-Pharr method from the unloading curve.

According to this method, the Young's modulus of an aerogel obtained without PVAc according to the process described above is 50 MPa. The inventors have observed that the incorporation of PVAc has the effect of increasing the value of the Young's modulus. Starting from 2.1% by weight of PVAc in the sol, the Young's modulus of the aerogel reaches the value of 80 MPa. The incorporation of PVAc therefore makes it possible to improve the crack resistance of the aerogel.

3) Impregnation Test

The optical element comprising an aerogel obtained as described above, with a concentration of PVAc in the starting 96% ethanol solution of 20% by weight, was subjected to an impregnation test with a silicone oil SilOil® available from Intas Pharmaceutical Ltd. SilOil® consists of polydimethylsiloxane.

It is observed that the penetration of this liquid does not give rise to any visible cracks. The aerogel is therefore sufficiently solid to withstand the capillary forces caused by the penetration of the liquid into its pores.

The invention claimed is:

1. A process for manufacturing a transparent optical element comprising:
   a) providing an optical element having a surface with at least one open cell;
   b) carrying out a surface treatment of said cell, the surface treatment increasing the wettability of the surface;
   c) preparing a solution comprising:
      an organic-aqueous solvent;
      at least one organic polymer, soluble in said solvent, having a weight-average molecular weight greater than 10,000 g/mol;
      at least one alkoxysilane selected from the group consisting of ($C_1$ to $C_3$ alkyl)tri($C_1$ to $C_3$ alkoxy)silanes and tetra($C_1$ to $C_3$ alkoxy)silanes and mixtures thereof;
   d) adding an acid or base hydrolysis catalyst to the solution so as to obtain a sol;
   e) depositing the sol in the pretreated cell before the gel point of the sol is achieved and sealing the filled cell using a film;
   f) leaving the optical element to stand in an alcoholic atmosphere for between 15 minutes and 5 hours in order to mature the gel;
   g) removing the film sealing the cell in an alcoholic medium;
   h) carrying out, in an autoclave, supercritical drying of the gel contained in the cell so as to obtain an aerogel.

2. The process as claimed in claim 1, wherein the optical element, comprises several open cells on the surface of this optical element, the cells having a largest dimension between 10 and 10,000 µm.

3. The process as claimed in claim 1, wherein the surface treatment carried out in step b) is performed with a low-pressure oxygen plasma.

4. The process as claimed in claim 1, wherein the polymer included in the solution is selected from the group consisting of polyvinyl acetate, polyvinyl alcohol, poly(vinyl acetate-co-vinyl alcohol) copolymers; polyoxyethylene, polyoxypropylene and mixtures thereof.

5. The process as claimed in claim 1, wherein the alkoxysilane included in the solution is tetramethoxysilane.

6. The process as claimed in claim 1, wherein the sol obtained at the end of step d) comprises:
   from 0.5% to 20% by weight, of polyvinyl acetate,
   from 20% to 60% by weight of tetramethoxysilane,
   the solvent consisting of a water/ethanol mixture.

7. The process as claimed in claim 1, wherein the sol obtained at the end of step d) also comprises an additive selected from colloidal silica particles and conductive particles.

8. The process as claimed in claim 7, wherein said conductive particles are selected from indium tin oxide (ITO) particles, tin oxide particles and metal particles.

9. The process as claimed in claim 1, wherein the drying step h) is carried out with supercritical $CO_2$.

10. The process as claimed in claim 1, further comprising a step i) of, after the supercritical drying step h), purging the autoclave with an anhydrous gas, before removing the optical element.

11. The process as claimed in claim 1, further comprising a step i) of placing the optical element obtained after step h) into a chamber having a controlled humidity.

12. A process for impregnating the optical element obtained by the process as claimed in claim 1, comprising impregnating the aerogel contained in the at least one cell of the optical element with a liquid, then sealing the impregnated cell with a sealant that isolates and protects contents of the cell from the external atmosphere.

* * * * *